(12) United States Patent
Tsui et al.

(10) Patent No.: US 8,195,566 B2
(45) Date of Patent: Jun. 5, 2012

(54) WEB SERVICE INTERFACES USED IN PROVIDING A BILLING SERVICE

(75) Inventors: Jerry Waikit Tsui, Markhan (CA); Paul Ming Chen, Markhan (CA); Alex Kwok Kee Tsui, Markham (CA)

(73) Assignee: International Business Machines Corporation, Armonk, NY (US)

( * ) Notice: Subject to any disclaimer, the term of this patent is extended or adjusted under 35 U.S.C. 154(b) by 2377 days.

(21) Appl. No.: 10/674,778

(22) Filed: Sep. 30, 2003

(65) Prior Publication Data

US 2004/0064411 A1      Apr. 1, 2004

(30) Foreign Application Priority Data

Sep. 30, 2002   (CA) ...................................... 2405700

(51) Int. Cl.
*G06F 3/00* (2006.01)
*G06F 15/16* (2006.01)
*G06F 15/177* (2006.01)

(52) U.S. Cl. .......... 705/40; 719/328; 709/201; 709/217; 709/224

(58) Field of Classification Search .................... 705/33, 705/34, 40; 719/328; 709/201, 217, 224
See application file for complete search history.

(56) References Cited

U.S. PATENT DOCUMENTS

| | | | | |
|---|---|---|---|---|
| 5,852,812 A | * | 12/1998 | Reeder ............................ | 705/39 |
| 5,943,656 A | * | 8/1999 | Crooks et al. .................... | 705/30 |
| 5,978,780 A | | 11/1999 | Watson ............................ | 705/40 |
| 6,016,509 A | | 1/2000 | Dedrick ........................... | 709/224 |
| 6,035,281 A | | 3/2000 | Crosskey et al. | |
| 6,052,671 A | | 4/2000 | Crooks et al. ................... | 705/43 |
| 6,182,054 B1 | | 1/2001 | Dickinson et al. .............. | 705/34 |
| 6,301,568 B2 | | 10/2001 | Globuschutz ................... | 705/44 |
| 6,317,490 B1 | * | 11/2001 | Cameron et al. ......... | 379/114.01 |
| 6,363,362 B1 | | 3/2002 | Burfield et al. ................. | 705/40 |
| 6,374,229 B1 | | 4/2002 | Lowrey et al. | |
| 6,377,939 B1 | | 4/2002 | Young | |
| 6,640,249 B1 | * | 10/2003 | Bowman-Amuah .......... | 709/228 |

(Continued)

FOREIGN PATENT DOCUMENTS

WO   WO01/84387 A2   11/2001

(Continued)

OTHER PUBLICATIONS

Best of AIIM 2002 Doug Henschen, Penny Lunt, Lowell Rapaport, Dexter Gasque. Transform Magazine. San Francisco: Apr. 2002. vol. 11, Iss. 4; p. 43, 5 pgs.*

(Continued)

*Primary Examiner* — William Rankins
(74) *Attorney, Agent, or Firm* — Patents on Demand; Brian K. Buchheit; Scott M. Garrett

(57) ABSTRACT

A web service interface defined for a billing service, comprising a plurality of application programming interfaces, where each application programming interface is associated with a billing function provided by the billing service, where each of the application programming interfaces can be implemented such that the billing function associated therewith is performed after a web service invocation that commands performance of that billing function is received by the web service interface. The web service interface is used to provide the billing service as a web service to computing applications in a distributed network environment.

19 Claims, 7 Drawing Sheets

U.S. PATENT DOCUMENTS

| | | | |
|---|---|---|---|
| 2001/0056362 A1 | 12/2001 | Hanagan et al. | |
| 2002/0010666 A1 | 1/2002 | Wright | |
| 2002/0026394 A1 | 2/2002 | Savage et al. | |
| 2002/0069163 A1 | 6/2002 | Gilbert | |
| 2002/0089990 A1 | 7/2002 | Rombeaut et al. | |
| 2002/0107754 A1 | 8/2002 | Stone | |
| 2002/0116334 A1 | 8/2002 | Bennett et al. | |
| 2002/0138828 A1* | 9/2002 | Robohm et al. | 725/1 |
| 2002/0180622 A1* | 12/2002 | Lui et al. | 341/22 |
| 2003/0061404 A1* | 3/2003 | Atwal et al. | 709/328 |
| 2003/0172145 A1* | 9/2003 | Nguyen | 709/223 |
| 2004/0030740 A1* | 2/2004 | Stelting | 709/201 |
| 2004/0064411 A1* | 4/2004 | Tsui et al. | 705/40 |
| 2004/0073661 A1 | 4/2004 | Eibach et al. | |
| 2007/0078950 A1* | 4/2007 | Hopkins et al. | 709/217 |

FOREIGN PATENT DOCUMENTS

| | | |
|---|---|---|
| WO | WO01/86570 A1 | 11/2001 |
| WO | WO01/90836 A2 | 11/2001 |

OTHER PUBLICATIONS

QuickStudy: Application Programming Interface (API) D avid Orenstein Jan. 10, 2000.*
Building Client Interfaces for .NET Web Services by Chris Peiris.*
Granite Systems and Step 9 Software Corporation Announce OSS Integration and Marketing Agreement PR Newswire. New York: Feb. 1, 2000.*
How to get started with server-side Java Take advantage of the platform-independent, object-oriented power of Netscape's server-side applets. An introduction. By Jason Hunter, JavaWorld.com, Mar. 1, 1997.*
Axs-One Launches Web Services for Services Industries Worldwide Videotex Update. Boston: Apr. 1, 2002. vol. 21, Iss. 4.*
Service-Oriented Architecture (SOA) and Web Services: Integration (EAI) by Qusay H. Mahmoud, Apr. 2005.*
Beyond the Buzz: Putting Web Services Theory Into Practice ; Organizations wrapping their arms around the development and security issues inherent in Web services must make at.*
Integrating Web-based e-commerce applications with business application system Martin Gaedke; Klaus Turowski Netnomics : Economic Research and Electronic Networking; 2000; 2, 2; ABI/INFORM Global.*
QuickStudy: Application Programming Interface (API) David Orenstein Jan. 10, 2000.*
Granite Systems and Step 9 Software Corporation Announce OSS Integration and Marketing Agreement PR Newswire. New York: Feb. 1, 2000. p. 1.*
Best of AIIM 2002 Doug Henschen, Penny Lunt, Lowell Rapaport, Dexter Gasque. Transform Magazine. San Francisco: Apr. 2002. vol. 11, Iss. 4.*
Java, XML, and Web services Jon Udell. InfoWorld. San Mateo: Mar. 25, 2002. vol. 24, Iss. 12; p. 52, 2.*
WebEntree: A web service aggregator Y Zhao. IBM Systems Journal. Armonk: 1998. vol. 37, Iss. 4; p. 584, 12.*
Busse, I., "Accounting Management for Global Broadband Connectivity Services", IEEE Proc. of 1998 Network Operations and Management Symposium Conference, vol. 1, pp. 159-168, Feb. 15, 1998.
Chang, B, "Real-Time Full Accounting Management System in Multi-Services Access Integrated Network Design and Implementation", J. of KISS, vol. 6, No. 2, pp. 254-264, Apr. 2000.

* cited by examiner

WEB SERVICE INTERFACES USED IN PROVIDING A BILLING SERVICE

FIELD OF THE INVENTION

The present invention relates generally to billing services and more particularly to billing services that are provided as web services in distributed network environments.

BACKGROUND OF THE INVENTION

Commercial service providers have made available to individual computing users a plethora of computing applications designed to perform a wide variety of tasks, referred to collectively as commercial services. In some instances, these commercial services may be made available to users without charge. However, many commercial service providers charge users for using their commercial services, or have a desire to do so. Commercial services made available by commercial service providers that charge for their usage are referred to herein as "billable services".

Billing systems are designed to perform a variety of billing functions. These billing systems are commonly used by commercial service providers to, for example, perform billing functions that facilitate the charging of users for the use of billable services. Billing systems are typically adapted to manage billing account information, charges, and billing account balances relating to the use of a billable service. These billing systems are also typically adapted to generate and present invoices (i.e. "bills") to users of the billable service. Since the billing functions of a billing system can themselves be made available for use (e.g. to commercial service providers in the above scenario), these billing functions may be referred to collectively as a "billing service".

Different types of services may be classified as billing services. For example, a billing account service and a rating service may each be considered as a billing service. A billing account service will typically provide various billing functions related to the management of user and billing account information, the calculation of billing account charges, the maintenance of invoice information, and the generation and presentation of invoices to users of a billable service, for example. On the other hand, a rating service will typically provide various other billing functions, including receiving incoming messages related to events that may be subject to billing, determining what billing rate should be charged for those events, calculating corresponding usage charges, and converting those events into chargeable billing events, for example. A billing rate defines the cost of a billable service (i.e. the commercial service being made available by a commercial service provider for which usage is charged) under a specific set of circumstances, and indicates how much a user should be charged per unit consumption of that billable service. The actual billing functions provided by different billing services can differ from service to service, and any given billing account service or rating service may not provide all of the respective billing functions specified above, which are provided only as examples.

The popularity of conducting transactions over the Internet has led to an increasing demand for businesses to integrate their computing systems, applications and services, with those of other businesses. These applications are often implemented using proprietary software written in differing programming languages. One known solution for integrating heterogeneous Internet-based applications or services introduced the concept of a "web service". A web service is a well-defined, self-contained component that encapsulates specific functionality, and makes that functionality available to other computing applications over the Internet (or an Intranet or other network) by invocation (also referred to herein as a "web service invocation") using a protocol. One example of a protocol that may be used in this context is the Simple Object Access Protocol (SOAP), which may be used by Internet-based application servers (also known as web servers), to provide web services. SOAP is a protocol that is often used in the exchange of information in decentralized, distributed network environments.

Recent developments in web services have imposed a greater need for software applications that are both modular and fit for use in distributed computing environments. Typical traditional billing systems, however, have not been designed in a manner that would allow them to be easily modified for providing web services.

Accordingly, there is a need for a means that would permit a billing service to be provided as a web service in distributed network environments.

SUMMARY OF THE INVENTION

The present invention relates to web service interfaces used to provide billing services in distributed network environments.

According to a first aspect of the invention, there is provided a web service interface defined for a billing service, wherein a plurality of first billing functions is provided by the billing service to computing applications residing on one or more computing devices in a distributed network, and wherein: the web service interface is adapted for coupling to a billing engine; the billing engine resides on a computing device in the distributed network and is adapted to perform the plurality of first billing functions; the web service interface comprises a plurality of application programming interfaces; each of the application programming interfaces is associated with a first billing function; and each of the application programming interfaces can be implemented such that the first billing function associated therewith is performed after a web service invocation that commands performance of the first billing function is received by the web service interface; whereby the web service interface is used to provide the billing service as a web service that can be invoked by the computing applications in the distributed network.

According to another aspect of the invention, there is provided a software system for use in designing a web service interface for a billing service, wherein a plurality of first billing functions is provided by the billing service to computing applications residing on one or more computing devices in a distributed network, the software system comprising: a web service interface defined for a billing service, wherein the web service interface is adapted for coupling to a billing engine, wherein the billing engine resides on a computing device in the distributed network and is adapted to perform the plurality of first billing functions, wherein the web service interface comprises a plurality of application programming interfaces, wherein each of the application programming interfaces is associated with a first billing function, wherein each of the application programming interfaces can be implemented such that the first billing function associated therewith is performed after a web service invocation that commands performance of the first billing function is received by the web service interface; and a plurality of object classes, wherein each of the object classes defines objects for storing data utilized by the billing engine and for communicating the data to the billing engine through at least one implemented application programming interface of the web service interface; whereby the web service interface is used to provide the billing service as a web service that can be invoked by the computing applications in the distributed network.

Software components of the software system may be stored on computer-readable media.

The present invention is directed to a web service interface used to provide a billing service as a web service that can be invoked by computing applications (e.g. those that provide commercial services) in distributed network environments. The web service interface comprises a set of application programming interfaces, where each application programming interface is associated with a billing function provided by the billing service.

In an embodiment of the invention, the web service interface is defined using an object-oriented programming language. In an embodiment of the invention, there is also provided a set of object classes that define objects for storing data utilized by a billing engine and for communicating the data to the billing engine through at least one implemented application programming interface of the web service interface.

By providing billing services as web services, the billing services can themselves be hosted, and accordingly, commercial service providers can be charged for their use. The present invention may also facilitate the offering of different implementations of billing services as web services, which can be subsequently discovered by service requesters in a Universal Description, Discovery and Integration (UDDI) registry. This may promote the sharing of computing resources within and among enterprises over the Internet.

BRIEF DESCRIPTION OF THE DRAWINGS

For a better understanding of the present invention, and to show more clearly how it may be carried into effect, reference will now be made, by way of example, to the accompanying drawings, wherein.

DETAILED DESCRIPTION OF THE PREFERRED EMBODIMENTS

The present invention is directed to a web service interface used to provide billing services as web services that can be invoked by computing applications in distributed network environments. In one embodiment of the invention, a web service interface is provided for each of two billing services: a billing account service and a rating service. The web service interfaces are defined using an object-oriented language, and different implementations of different billing systems can be designed by extending the web service interfaces.

Figure 1:
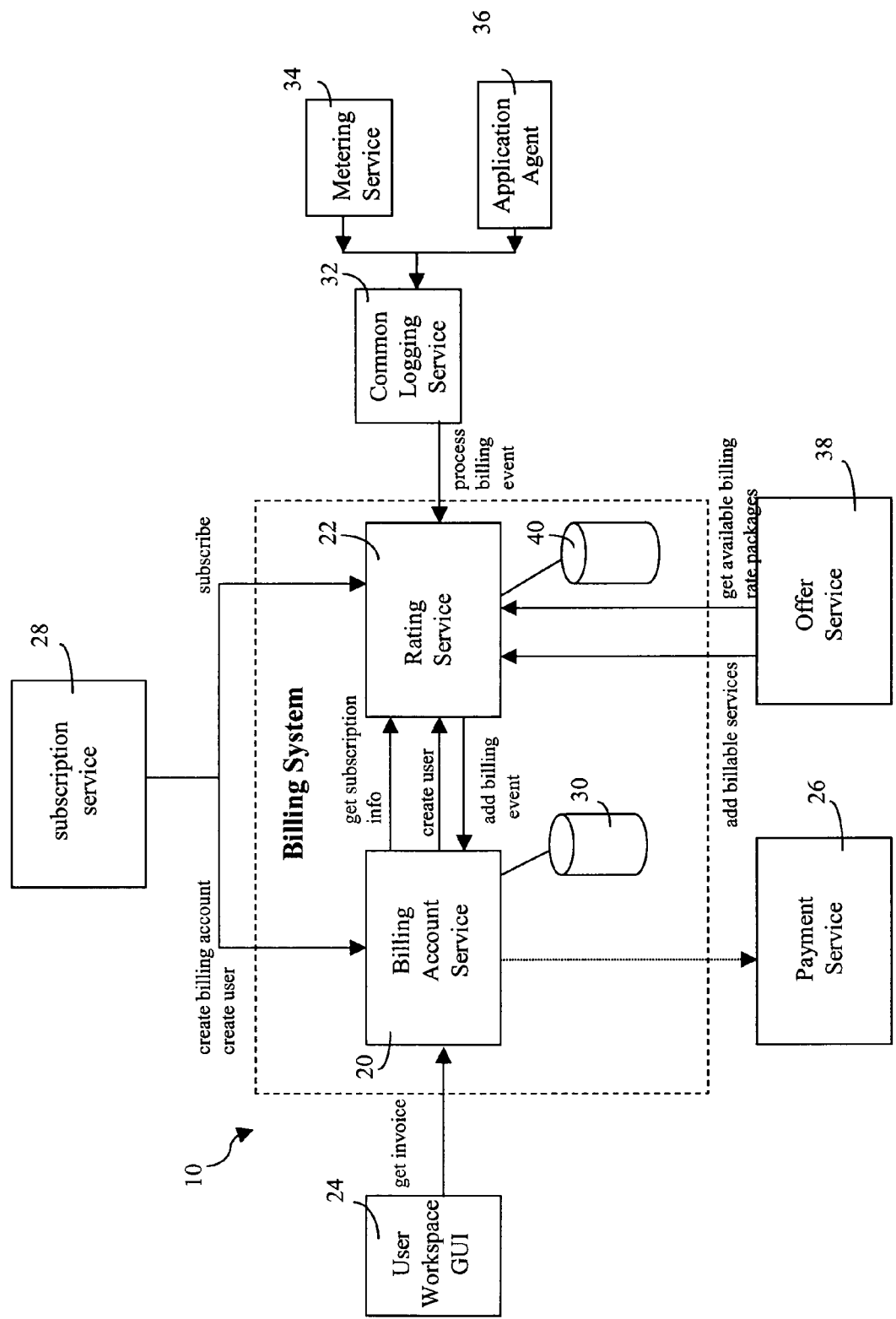
FIG. 1 is a schematic diagram illustrating a typical flow of messages between services in a distributed network and components of a billing system in an embodiment of the present invention.

Referring to FIG. 1, a schematic diagram illustrating a typical flow of messages between services in a distributed network and components of a billing system in an embodiment of the present invention is shown generally as 10.

Billing system 10 provides different billing functions (referred to herein collectively as a billing service) as a web service that can be invoked by computing applications [not shown], which provide commercial services made available by commercial service providers. Accordingly, billing system 10 can be utilized by a commercial service provider to bill users for use of the commercial services that the commercial service provider makes available. As indicated earlier, commercial services made available by commercial service providers that charge for their usage can be referred to as billable services. The types of charges that may arise from usage of a billable service may include, for example:

i. a one-time charge—a single one-time charge for use of the billable service;

ii. a setup charge—a one-time charge for the first time the billable service is used;

iii. a monthly recurring charge—at a rate based on monthly usage of the billable service;

iv. an annually recurring charge—at a rate based on yearly usage of the billable service;

v. fixed usage charge—a fixed charge when the billable service is used once;

vi. variable usage charge—a variable charge based on the usage of a resource of the billable service; and vii. event charges—a charge generated upon the occurrence of a particular billing event.

While the billing functions of billing system 10 are provided as a web service in accordance with the present invention, some of the billable services may themselves be services that are being provided as web services. The computing applications that provide billable services reside on computing devices in a distributed network to which billing system 10 is coupled.

Billing system 10 may operate behind a firewall [not shown] for security reasons.

Billing system 10 makes available two billing services: a billing account service 20 and a rating service 22. Each provides a set of billing functions as a web service to commercial service providers. Billing account service 20 maintains user and billing account information associated with a billable service. Billing account service 20 also maintains invoice information (i.e. bill information), including invoice charges, invoice line details, and payment status. Furthermore, billing account service 20 generates and presents invoices to users. Billing account service 20 may receive billing requests for invoices through a workspace graphical user interface (GUI) 24, and can communicate data to a payment service 26 for handling online payment of invoices, for example. Billing account service 20 may also be coupled to a subscription service 28, from which it may receive billing requests to create records associated with new users and billing accounts. User and billing account information is stored by billing account service 20 in a billing account service database 30.

In general, rating service 22 calculates charges to be applied to a user's billing account for the consumption of a specific, user-subscribed billable service made available by a commercial service provider. To facilitate these calculations, rating service 22 keeps track of subscription information. A subscription associates a billable service and a billing rate or package of billing rates with a user. A billing rate package defines the applicable charges under a specific set of circumstances (e.g. a billing rate of $1/hour for using a billable service that provides users with access to the Internet in the morning, a billing rate of $2/hour in the afternoon, and a billing rate of $3/hour in the evening). The commercial service provider may also make available multiple billable services (e.g. an "offer"), with which a billing rate or package of billing rates is associated. When the user subscribes to a specific billable service, the user is permitted to use that billable service subject to the charges as defined by the relevant billing rate or billing rate package.

Rating service 22 is coupled to subscription service 28, from which it receives billing requests to generate subscriptions. Subscription information and user information may also be received by rating service 22 from billing account service 20. Billing requests received by rating service 22 may include requests to process billing events (i.e. events for which a user of a billable service may be charged) from a logging service 32, a metering service 34 (either directly, or indirectly through logging service 32 as shown in FIG. 1), or from other applications 36 (either directly, possibly via application adapters where appropriate, or indirectly through logging service 32 as shown in FIG. 1, for example). For example, a scheduler [not shown] may be used to extract metering events from metering service 34, and to convert the metering events into billing events to be communicated to rating service 22 for processing. After a billing request is received, rating service 22 calculates charges to be applied to a user's billing account, and communicates the information to billing account service 20. Rating service 22 can also coordinate with an offer service 38 that is used to define available billable services and associated billing rates or billing rate packages.

Data utilized by rating service 22 is stored in a rating service database 40. In different configurations of billing system 10, the data in rating service database 40 and the data in billing account service database 30 may be stored in a common database, or may alternatively be distributed across multiple databases or storage means. Furthermore, in different configurations of billing system 10, the data in rating service database 40 and the data in billing account service database 30 may be stored in one or more databases residing on a computing device that is remotely located from the computing device(s) [not shown in FIG. 1] on which billing account service 20 and/or rating service 22 reside.

Figure 2:
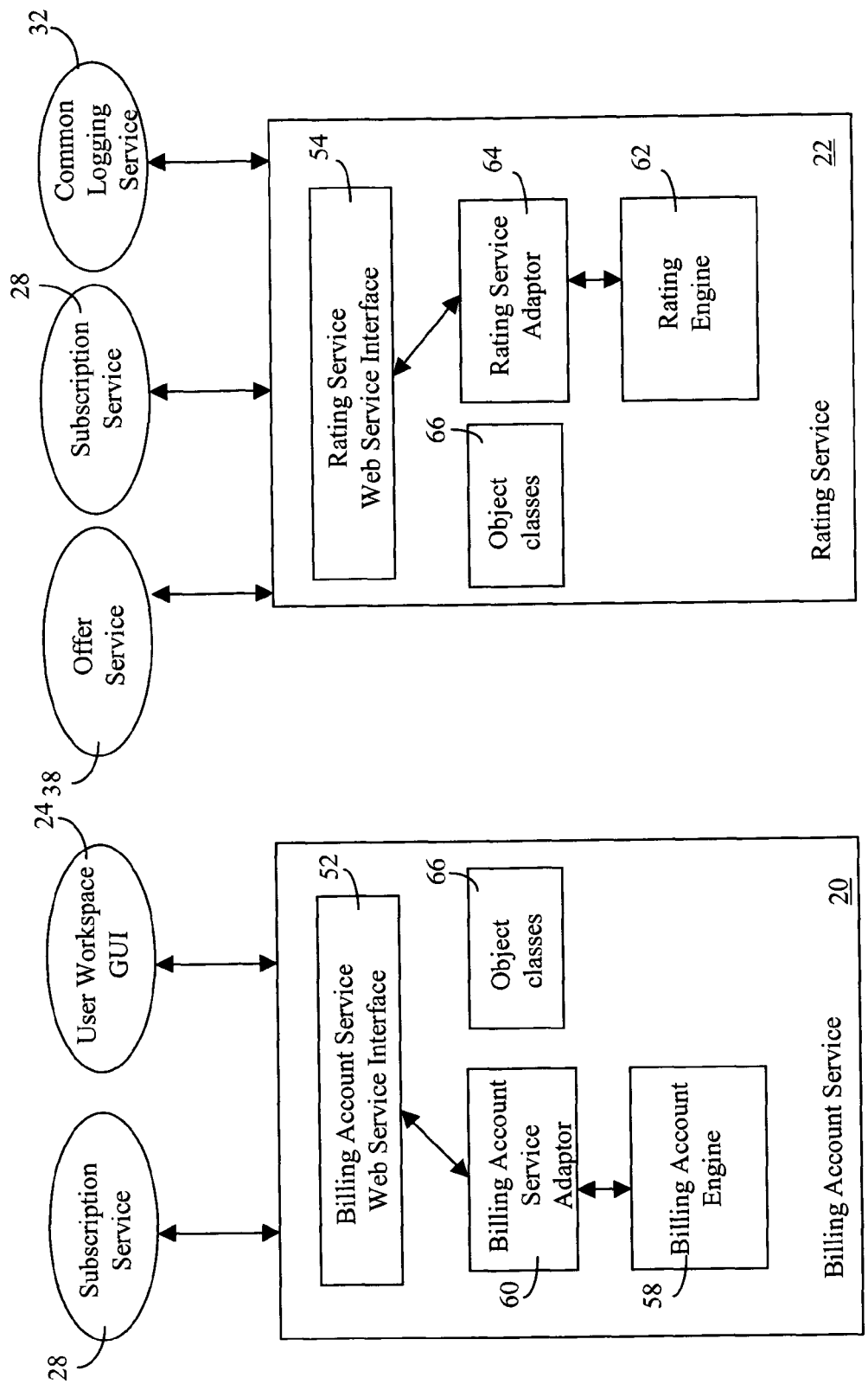
FIG. 2 is a schematic diagram illustrating components of a billing system, which includes web service interfaces designed in accordance with an embodiment of the present invention.

Referring to FIG. 2, a schematic diagram is shown illustrating components of billing system 10, which includes web service interfaces designed in accordance with an embodiment of the present invention.

FIG. 2 illustrates the components used to implement billing account service 20 and rating service 22 (as shown in FIG. 1) in greater detail. In accordance with this embodiment of the present invention, a billing account service web service interface 52 and a rating service web service interface 54 is provided, respectively. These web service interfaces 52, 54 are used to make the billing functions of billing account service 20 and rating service 22 available to computing applications as web services. Each of these web service interfaces 52, 54 are coupled to a different billing engine, as described in further detail below.

Billing account service web service interface 52 provides an interface to a billing account engine 58, which is a billing engine that has been programmed to perform at least a predefined set of billing functions that billing account service 20 is to provide. While billing account engine 58 may be a proprietary engine, in variant embodiments of the invention, it may also be a third party billing account engine. Billing account service web service interface 52 may be directly coupled to billing account engine 58, or indirectly coupled to billing account engine 58 through a billing account service adapter 60 that translates function calls between billing account service web service interface 52 and billing account engine 58, where required. As billing account service web service interface 52 makes billing functions available as a web service, computing applications can command performance of these billing functions by communicating an appropriate web service invocation or call to billing account service web service interface 52.

Billing account service web service interface 52 comprises a number of application programming interfaces that must first be implemented before billing account service 20 is made accessible for use by other computing applications. Each of these application programming interfaces is associated with a specific billing function of billing account engine 58. Each application programming interface is to be implemented by a software developer so that the corresponding billing function can be performed after a web service invocation that commands performance of the billing function is received by the billing account service web service interface 52. Accordingly, billing account service web service interface 52 is designed for coupling to a specific billing account engine 58, by implementing the methods in the basic definition of the billing service web service interface 52 provided below. It will be understood by persons skilled in the art that the terms "software developer", "software designer", and "software programmer" may be used interchangeably, and that the actions derived from the terms "develop", "design", and "program" may also be used interchangeably in describing the present invention without departing from the scope of the present invention.

A basic definition of the billing account service web service interface 52 can be provided in a software system for use in designing a billing account service web service interface 52 for a specific billing account engine 58. One such basic definition of the billing account service web service interface 52 is as follows:

```
public interface BillingServiceInterface {
    public boolean createInvoiceLine(BillingEvent billingEvent);
    public String createAccount(BillingAccount billingAccount);
    public boolean deleteAccount(String accountKey);
    public String getAccountStatus(String accountKey);
```

-continued

```
        public String getInvoice(String accountKey, Date startDate,
            Date endDate);
            public boolean setAccountStatus(String accountKey, String status);
    }
```

Billing account service web service interface 52 includes the following application program interfaces (API):
1. public boolean createInvoiceLine(BillingEvent billingEvent);
    This API creates a record of a billing event in the relevant billing account.
2. public String createAccount(BillingAccount billingAccount);
    This API creates a record for a billing account and, if required, creates a record for a user in billing system 10. If the operation is successful, it returns the same billing account key back to the caller if the billing account key is provided in the call, or it returns a generated billing account key back to the caller if the billing system 10 is expected to generate a billing account key.
3. public boolean deleteAccount(String accountKey);
    This API deletes the relevant billing account.
4. public String getAccountStatus(String accountKey);
    This API gets and returns the status of the relevant billing account.
5. public String getInvoice(String accountKey, Date startDate, Date endDate);
    This API gets the invoice for a given billing account.
6. public boolean setAccountStatus(String accountKey, String status);
    This API sets the status of a billing account to the given value, and returns true if the operation is successful, and false if unsuccessful.

Billing service web service interface 52 is extendable (in an object-oriented programming sense) in order to provide additional billing functions that billing account engine 58 may be adapted to perform.

Similarly, rating service web service interface 54 provides an interface to a rating engine 62, which is a billing engine that has been programmed to perform at least a pre-defined set of billing functions that rating service 22 is to provide. While rating engine 62 may be a proprietary engine, in variant embodiments of the invention, it may also be a third party rating engine. Rating service web service interface 54 may be directly coupled to rating engine 62, or indirectly coupled to rating engine 62 through a rating service adapter 64 that translates function calls between rating service web service interface 54 and rating engine 62, where required. As rating service web service interface 54 makes billing functions available as a web service, computing applications can command performance of these billing functions by communicating an appropriate web service invocation or call to rating service web service interface 54.

Rating service web service interface 54 comprises a number of application programming interfaces that must first be implemented before rating service 22 is made accessible for use by other computing applications. Each of these application programming interfaces is associated with a specific billing function of rating engine 62. Each application programming interface is to be implemented by a software developer so that the corresponding billing function can be performed after a web service invocation that commands performance of the billing function is received by the rating service web service interface 54. Accordingly, rating service web service interface 54 is designed for coupling to a specific rating engine 62, by implementing the methods in the basic definition of the rating service web service interface 54 provided below.

A basic definition of the rating service web service interface 54 can be provided in a software system for use in designing a rating service web service interface 54 to a specific rating engine 62. One such basic definition of the rating service web service interface 54 is as follows:

```
public interface RatingServiceInterface {
            public boolean registerService(BillableService[] billableServices);
            public BillingRatePackage[] getAvailableRatePackages(
                BillableService billableService);
            public BillableServiceInstance[]getSubScribedServiceInstances(
                BillingAccount billingAccount);
            public int processBillingEvent(BillingEvent[] billingEvents);
            public boolean subscribe(BillingSubscription billingSubscription);
            public boolean unsubscribe(BillingSubscription billingSubscription);
    }
```

Rating service web service interface 54 includes the following application program interfaces (API):
1. public boolean registerService(BillableService[ ] billableServices);
    This API creates or adds one or more billable services to be monitored by billing system 10.
2. public BillingRatePackage[ ] getAvailableRatePackages (BillableService billableService);
    This API gets all the available billing rate packages for the specified billable service.
3. public BillableServiceInstance[ ] getSubscribedServiceInstances(BillingAccount billingAccount);
    This API gets all the billable service instances that have been created or subscribed to for a specified billing account.
4. public int processBillingEvent(BillingEvent[ ] billingEvents);
    This API processes a number of billing events by finding out the charges of the billing events, and communicates data pertaining to the charges to the billing account service 20 as appropriate. This API returns an integer value showing the number of billing events that have been successfully processed.

5. public boolean subscribe(BillingSubscription billingSubscription);
   This API binds a billing account to an offer, billable services, or billable service instances.
6. public boolean unsubscribe(BillingSubscription billingSubscription);
   This API unsubscribes the offer, billable services, or billable service instances for a billing account.

In an embodiment of the present invention, a set of object classes 66 is also provided in a software system for use in designing web service interfaces (e.g. billing account service web service interface 52, rating service web service interface 54). Object classes 66 define objects for storing data utilized by a billing engine (e.g. billing account engine 58, rating engine 62) and for communicating the data to the billing engine through at least one implemented application programming interface of the respective web service interface. In this embodiment of the invention, billing account service web service interface 52 and rating service web service interface 54 use objects defined by the object classes 66 provided below, for communicating data to billing account engine 58 and rating engine 62 respectively.

For a billing account:

```
public interface BillingAccount extends java.io.Serializable {
        public static final String STATUS_ACTIVE = "Active";
        public static final String STATUS_INACTIVE = "Inactive";
        public static final String STATUS_PENDING = "Pending";
        public String getAccountName();
        public String getUniqueUserIdentifier();
        public String getParentAccountKey();
        public String getAccountKey();
        public String getPaymentInfoXML();
}
```

A billing account is an entity that charges may be made against. Certain billing accounts may be invoiced and are associated with an organization entity or organization entity owner, while other billing accounts are associated with individual users. The billing accounts of an organization entity or an organization entity owner can be used to track the accumulated charges of all billing accounts associated with users that belong to the organization entity. In that scenario, a billing account would be created for each user in an organization entity.

For a billing event:

```
public interface BillingEvent extends java.io.Serializable {
    public String getEventName();
    public String getAccountName();
    public String getUniqueUserIdentifier();
    public String getAccountKey();
    public String getRateType();
    public String getResourceType();
    public String getServiceName();
    public Date getEventTime();
    public int getUsage();
    public String[] getContractKeys();
    public String[] getRatePackageKeys();
    public String[] getServiceInstNames();
}
```

A billing event is a record that can be used to calculate the usage of a billable service and the charges to be applied to the relevant billing account. Each billing event object encapsulates a billing event, and may contain the following attributes for the billing event: billing event name, billing account name, user identifier, billing account key, billing rate type to be applied, resource type to be applied, billable service name, billing event time, usage of the billable service in terms of the resource type, contact keys, billing rate package keys, and billable service instance names, for example. An actual implementation of the billing event object interface may use some or all of these attributes, and may include additional attributes.

For a billing rate package:

```
public interface BillingRatePackage extends java.io.Serializable {
        public String getRatePackageDescription();
        public String getRatePackageKey();
}
```

A billing rate package represents a package of billing rates to be associated with a billable service during subscription or during offer creation. Each BillingRatePackage object encapsulates a billing rate package, which may include the following attributes: billing rate package key that can be used to identify a billing rate package, and billing rate package description, for example. An actual implementation of the billing rate package object interface may use some or all of these attributes, and may include additional attributes.

For a billable service:

```
public interface BillableService extends java.io.Serializable {
        public String getServiceDescription();
        public String getServiceName();
        public String getServiceKey();
}
```

A billable service is a commercial service that we have registered or recorded in billing system 10 that a service provider wishes to monitor the usage of and charge users for using that commercial service. A BillableService object encapsulates a billable service, which may include the following attributes: billable service key that can be used to uniquely identify the billable service, billable service name, and billable service description. An actual implementation of the billable service object interface may use some or all of these attributes, and may include additional attributes.

For a billing subscription:

```
public interface BillingSubscription extends java.io.Serializable {
        public String[] getContractKeys();
        public String getOfferKey();
        public String[] getRatePackageKeys();
        public String[] getServiceInstNames();
        public String[] getServiceNames();
        public String getAccountKey();
}
```

A billing subscription represents a subscription, or an association of a billing account (or a user) with an offer that may include one or more billable services and associated billing rate package(s). Billing rate packages can be used to calculate the charges to be applied to the billing account for usage of billable services. For example, a user can subscribe to an offer that consists of three billable services, including e-mail, internet access, and storage space, with each service associated with a different billing rate package. A BillingSubscription object encapsulates the subscription or the association. The BillingSubscription object may include the following attributes: billing account key that can be used to uniquely identify a billing account, names of billable services included in a subscription, billable service instance names, billing rate package keys, offer keys that can be used to uniquely identify an offer, and contract keys, for example. An actual implementation of the billing subscription object interface may use some or all of these attributes, and may include additional attributes.

For a billable service instance:

```
public interface BillableServiceInstance extends java.io.Serializable {
    public String getServiceName();
    public String getServiceKey();
    public String getServiceInstanceName();
}
```

A billable service instance represents an instance of a billable service created for a particular billing account during subscription. For example, if a user subscribed to use a certain computing application made available by a commercial service provider, an instance of that computing application is created and associated with the user, so that the user can run its own instance of the computing application instead of sharing the same instance with other users or subscribers. A BillingServiceInstance object encapsulates the billable service instance and may include the following attributes: billable service key that is used to uniquely identify a billable service, billable service name, and billable service instance name, for example. An actual implementation of the billable service instance object interface may use some or all of these attributes, and may include additional attributes.

Referring now to FIGS. 3 through 7, schematic diagrams illustrating alternative implementations of a billing account service web service interface and a rating service web service interface in different embodiments of the present invention are provided.

In an embodiment of the present invention, after billing account service web service interface 52 and rating service web service interface 54 have been implemented such that the billing functions of the underlying billing account engine 58 and rating engine 62 are made available as a billing account service 20 and a rating service 22 respectively, billing account service 20 and rating service 22 are deployed on a web server so that they may be offered as web services. Other computing applications 68 can then invoke the web services over a distributed network (e.g. the Internet).

Figure 3:
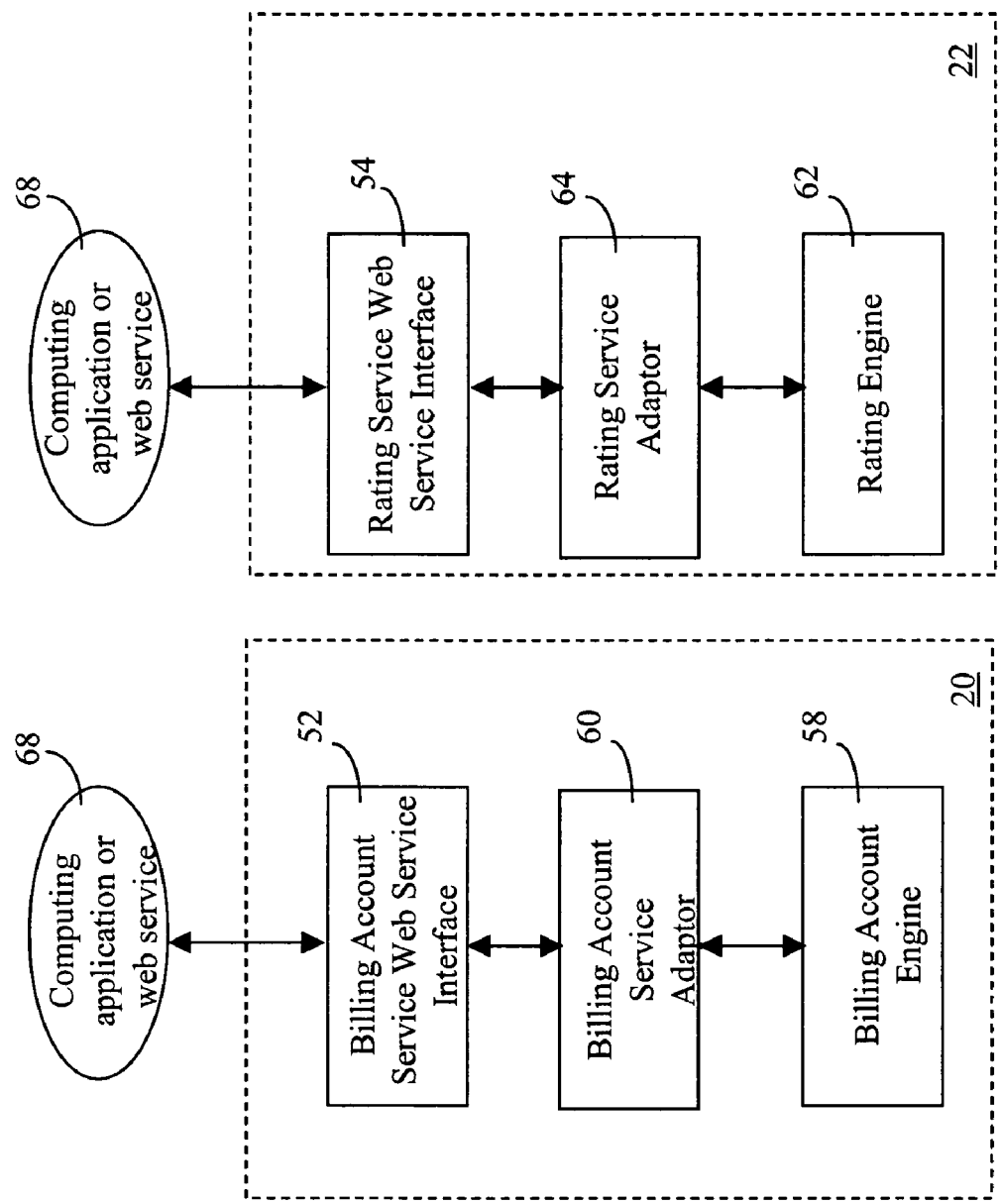
FIG. 3 is a schematic diagram illustrating individual implementations of a billing account service web service interface and a rating service web service interface in an embodiment of the present invention.

Referring to FIG. 3, a schematic diagram illustrating individual implementations of a billing account service web service interface and a rating service web service interface in an embodiment of the present invention is provided. In this embodiment of the invention, two billing services are implemented: a billing account service 20 and a rating service 22. In this case, a billing account service web service interface 52 is coupled to a first billing engine, which is specifically a billing account engine 58. Optionally, in implementing billing account service 20, a billing account service adaptor 60 may be used where required, coupled to both billing account service web service interface 52 and billing account engine 58. Similarly, a rating service web service interface 54 is coupled to a separate, second billing engine, which is specifically a rating engine 62. Optionally, in implementing rating service 22, a rating service adaptor 64 may be used where required, coupled to both rating service web service interface 54 and rating engine 62. In this embodiment, both billing account service web service interface 52 and rating service web service interface 54 are implemented for coupling to individual billing engines to provide a billing service, as was also illustrated in FIG. 2. Each individual billing engine 58, 62 may either be a proprietary engine or a third party billing engine. In some uses of billing account service 20 and rating service 22, a computing application 68 to which billing account service 20 is provided may itself provide a rating service, and a computing application 68 to which rating service 22 is provided may itself provide a billing account service.

Figure 4:
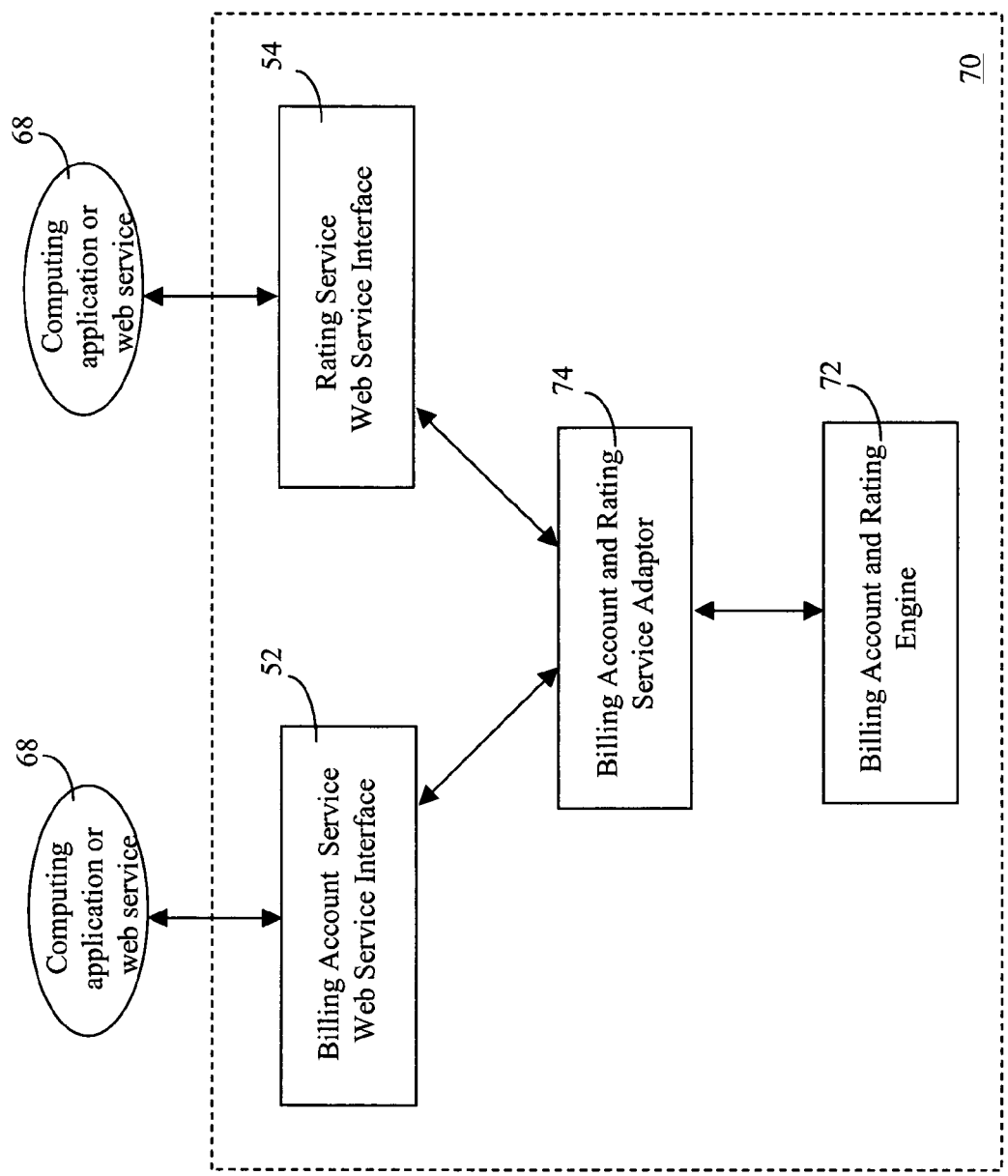
FIG. 4 is a schematic diagram illustrating a common implementation of a billing account service web service interface and a rating service web service interface in another embodiment of the present invention.

Referring to FIG. 4, a schematic diagram illustrating a common implementation of a billing account service web service interface and a rating service web service interface in another embodiment of the present invention is provided. In this embodiment, a billing service 70 is implemented that provides both billing functions that would typically be provided by a billing account service, and also billing functions that would typically be provided by a rating service. In FIG. 4, both a billing account service web service interface 52 and a rating service web service interface 54 are coupled to the same billing engine, which is specifically a billing account and rating engine 72. Optionally, in this implementation, a billing account and rating service adaptor 74 may be used where required, coupled to billing account service web service interface 52, rating service web service interface 54, and billing account and rating engine 72. In this embodiment of the invention, both billing account service web service interface 52 and rating service web service interface 54 are implemented for coupling to a common billing engine (e.g. billing account and rating engine 72) to provide a billing service, and the common billing engine may either be a proprietary engine or a third party billing engine.

Figure 5:
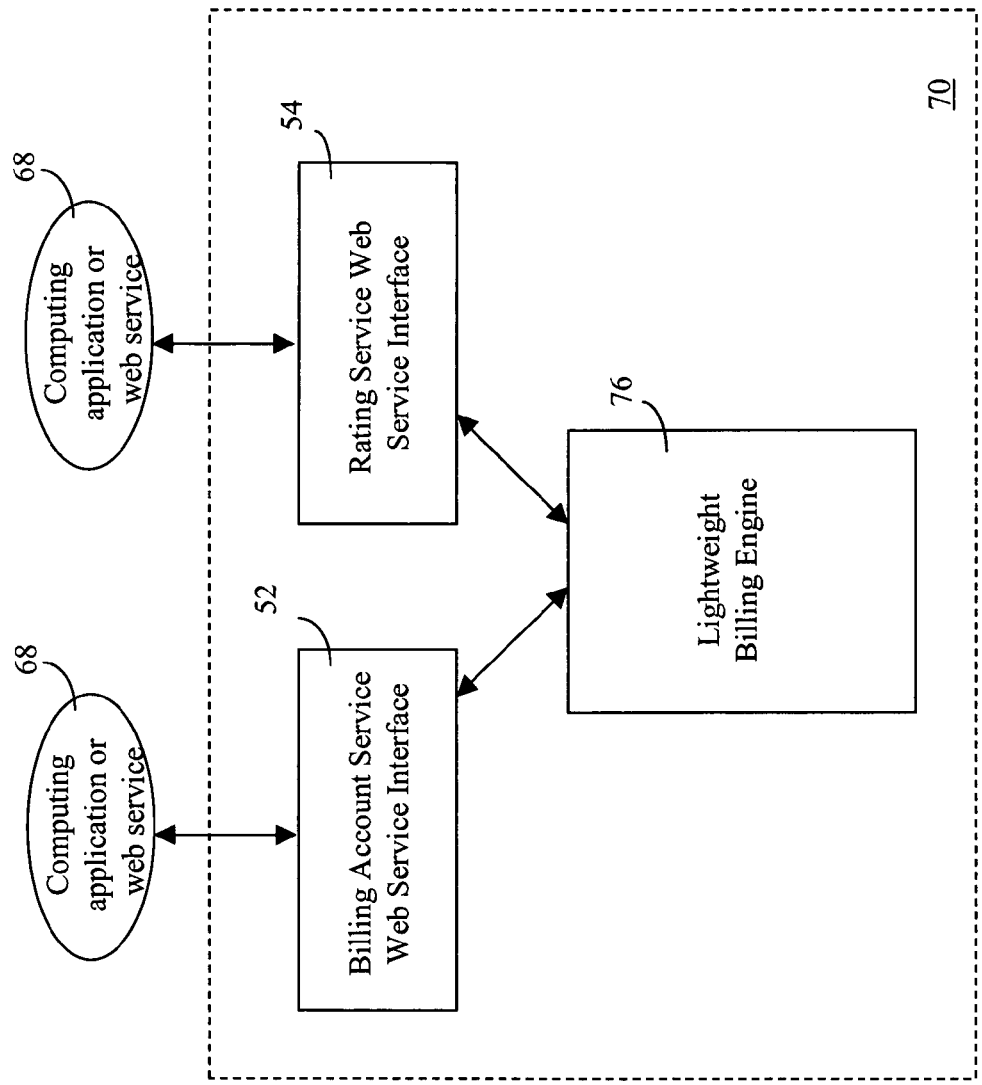
FIG. 5 is a schematic diagram illustrating an implementation of a billing account service web service interface and a rating service web service interface coupled to a lightweight billing engine in another embodiment of the present invention.

Referring to FIG. 5, a schematic diagram illustrating an implementation of a billing account service web service interface and a rating service web service interface in another embodiment of the present invention is provided. In this embodiment, a billing service 70 is implemented that provides both billing functions that would typically be provided by a billing account service, and also billing functions that would typically be provided by a rating service. In FIG. 5, both a billing account service web service interface 52 and a rating service web service interface 54 are coupled to the same billing engine, which is specifically a lightweight billing engine 76. Optionally, in this implementation, an appropriate adaptor [not shown] may be used, where required. The embodiment of the invention shown in FIG. 5 is similar to that shown in FIG. 4, except that the common billing engine in FIG. 5 is specifically a "lightweight billing engine". A lightweight billing engine is a simple billing engine that can perform a basic set of billing functions. The lightweight billing engine can itself, be implemented as a web service. The lightweight billing engine offers sufficient functionality for use in small to medium-sized service hosting platforms. The lightweight billing engine is designed for easy installation and configuration, and to be highly customizable.

Figure 6:
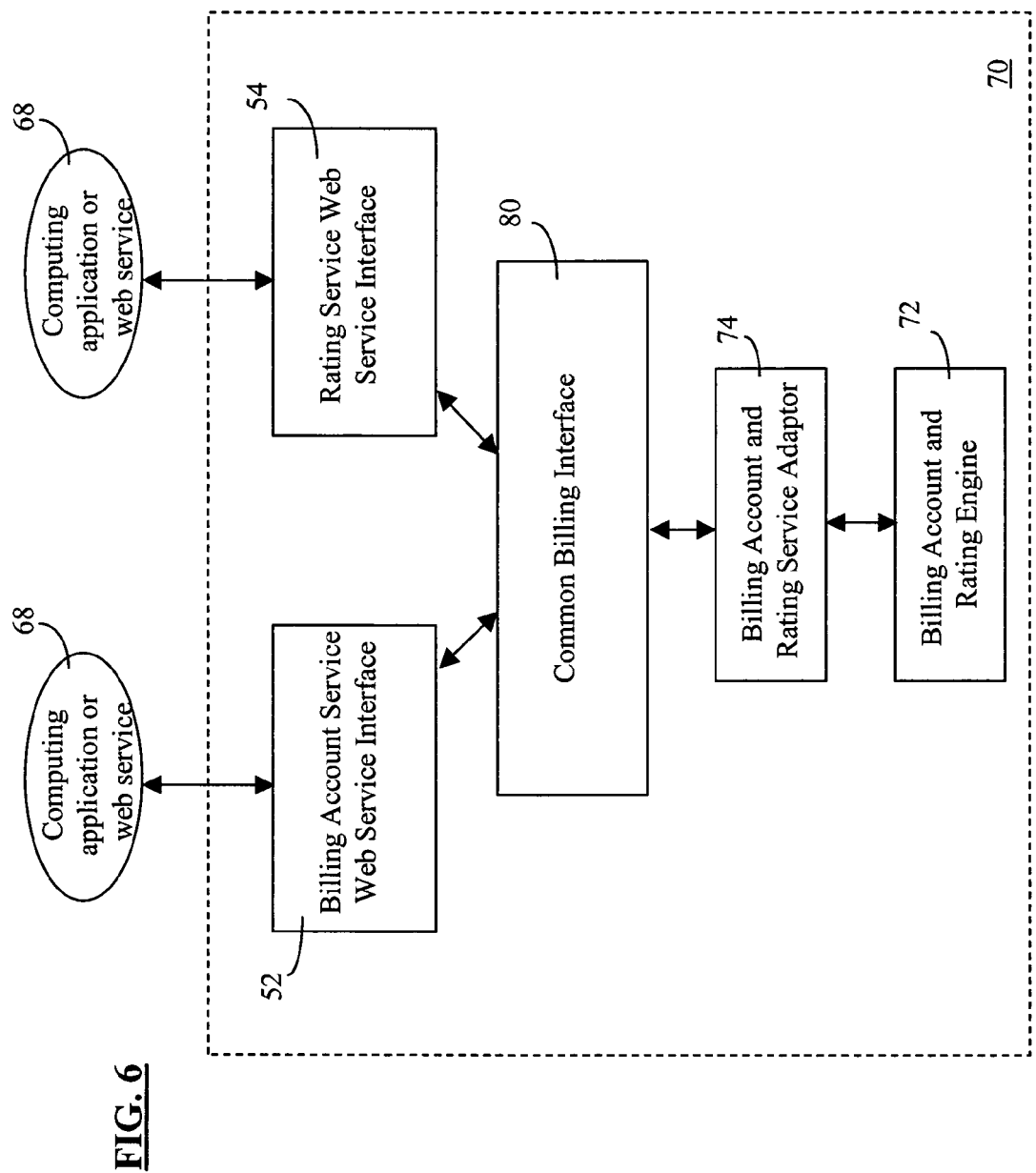
FIG. 6 is a schematic diagram illustrating an implementation of a billing account service web service interface and a rating service web service interface coupled to a common billing interface in another embodiment of the present invention.
Figure 7:
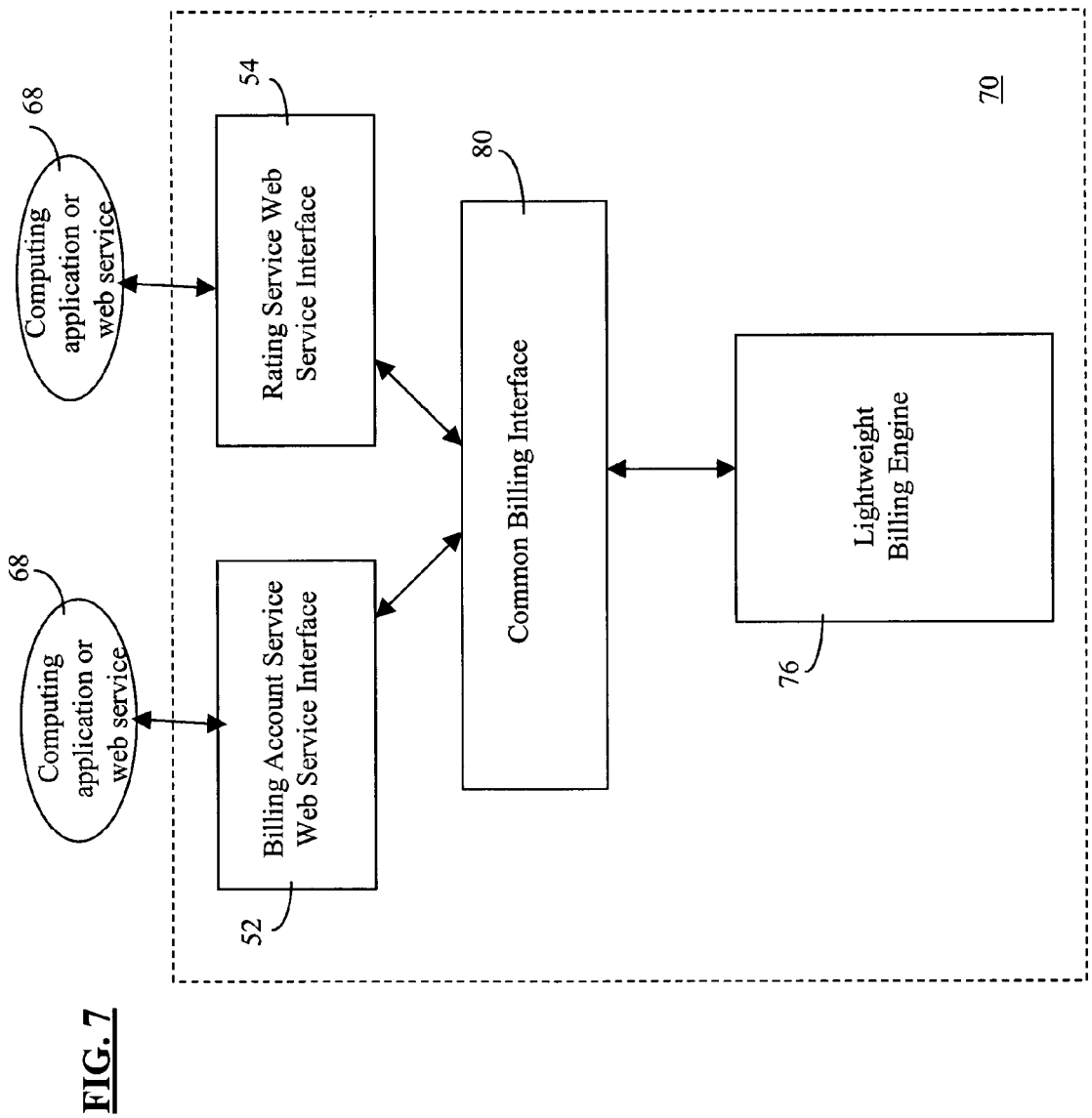
FIG. 7 is a schematic diagram illustrating an implementation of a billing account service web service interface and a rating service web service interface coupled to a common billing interface in another embodiment of the present invention.

Referring to FIGS. 6 and 7, a schematic diagram illustrating an implementation of a billing account service web service interface and a rating service web service interface in another embodiment of the present invention is provided in each Figure. In these embodiments, both a billing account service web service interface 52 and a rating service web service interface 54 are coupled to a common billing interface 80, through which data is communicated to its underlying billing engine(s) and/or system(s). In FIG. 6, the underlying billing engine is a billing account and rating engine 72 (e.g. as shown in FIG. 4), and in FIG. 7, the underlying billing engine is a lightweight billing engine 76 (e.g. as shown in FIG. 5). The use of a common billing interface 80 may be advantageous in that a software designer would not need to change the implementation of a billing account service web service interface 52 and a rating service web service interface 54 when there is a change in an underlying billing engine or system, since all the relevant implementation details are encapsulated by the common billing interface 80.

In other words, the embodiments shown in FIGS. 6 and 7 employ the use of a common billing interface 80, such that a web services interface (e.g. 52, 54) need only be implemented in a generic way (i.e. not specific to any billing engine or system) in order to make the necessary calls to common billing interface 80. In contrast, the embodiments shown in FIGS. 3 to 5 require that a web service interface (e.g. 52, 54) be implemented with regard to the specific billing engine or system to which it is coupled (i.e. customized to that specific billing engine or system).

As indicated earlier, since the present invention allows a billing service to be provided as a web service, as a web service, the billing service may itself be hosted and provided as a billable service. Accordingly, in variant embodiments of the invention, a billing system may itself invoke one or more other billing services, which may include a billing account service, a rating service, or a billing account and rating service, for example.

In variant embodiments of the invention, the components in an implementation of one or more billing services provided as a web service may be distributed across multiple computing devices in a distributed network.

The present invention has been described with regard to specific embodiments. However, it will be obvious to persons skilled in the art that a number of variants and modifications can be made without departing from the scope of the invention defined in the claims appended hereto.

What is claimed is:

1. A software system digitally encoded in at least one non-transitory machine readable medium configured to be usable by at least one machine for use in providing a web service interface for a billing service, wherein a plurality of billing functions is provided by said billing service to computing applications residing on one or more computing devices in a distributed network, the software system comprising:
   a. a web service interface, which is implemented within software stored on a non-transitory computer readable medium, defined for a billing service, said web service interface being adapted for coupling to a billing engine, said billing engine residing on a computing device in said distributed network and being adapted to perform said plurality of billing functions, said web service interface comprises a plurality of application programming interfaces, each of said application programming interfaces being associated with one of said billing functions and being implemented such that the billing function associated therewith is performed after a web service invocation that commands performance of said billing function is received by said web service interface; and
   b. a plurality of object classes which are implemented within software stored on a non-transitory computer readable medium, each of said object classes defining objects for storing data utilized by said billing engine and for communicating said data to said billing engine through at least one implemented application programming interface of said web service interface, said web service interface being used to provide said billing service as a web service that is configured to be invoked by said computing applications in said distributed network.

2. The software system as claimed in claim 1, wherein said web service interface is extendable to provide said computing application with billing functions other than said plurality of billing functions, and said billing engine is adapted to perform said billing functions, wherein the Web service is a self-contained component that encapsulates functionality, which is made available to other computing applications over a network by web service invocation using a Simple Object Access Protocol (SOAP).

3. The software system as claimed in claim 1, wherein said billing service is a billing account service, and wherein the web service interface defined for said billing account service comprises application programming interfaces associated with at least three of the following billing functions:
   i. creating billing accounts;
   ii. deleting billing accounts;
   iii. creating records of billing events in a billing account;
   iv. setting the status of a billing account;
   v. obtaining the status of a billing account; and
   vi. obtaining an invoice for a billing account.

4. The software system as claimed in claim 1, wherein said billing service is a rating service, and wherein the web service interface defined for said rating service comprises application programming interfaces associated with at least three of the following billing functions:
   i. registering billable services;
   ii. obtaining a billing rate package for a billable service;
   iii. subscribing a billable service for a billing account;
   iv. unsubscribing a billable service for a billing account;
   v. obtaining subscribed billable service instances for a billing account; and
   vi. processing billing events.

5. The software system as claimed in claim 1, wherein said plurality of object classes define three or more of the following objects:
   i. billing accounts;
   ii. billing events;
   iii. billing rate packages;
   iv. billable services;
   v. billing subscriptions; and
   vi. billable service instances.

6. A computer-readable medium upon which a set of software components is stored, said software components for use in providing a web service interface for a billing service, wherein a plurality of billing functions is provided by said billing service to computing applications residing on one or more computing devices in a distributed network, the set of software components comprising:
   a. a web service interface for a billing service, said web service interface being adapted to be coupled to a billing engine, said billing engine residing on a computing device in said distributed network and being adapted to perform said plurality of billing functions, said web service interface comprising a plurality of application programming interfaces, each of said application programming interfaces being associated with associated with one of said billing functions, each of said application programming interfaces being implemented such that the billing function associated therewith is performed after a web service invocation that commands performance of said billing function is received by said web service interface; and b. a plurality of object classes, each of said object classes defining objects for storing data utilized by said billing engine and for communicating said data to said billing engine through at least one implemented application programming interface of said web service interface,
said web service interface being used to provide said billing service as a web service that is configured to be invoked by said computing applications in said distributed network.

7. The computer-readable medium as claimed in claim 6, wherein said web service interface is extendable to provide said computing application with billing functions other than said plurality of billing functions, and said billing engine is adapted to perform said billing functions, wherein the Web service is a self-contained component that encapsulates functionality, which is made available to other computing applications over a network by web service invocation using a Simple Object Access Protocol (SOAP).

8. The computer-readable medium as claimed in claim 6, wherein said billing service is a billing account service, and the web service interface defined for said billing account service comprises application programming interfaces associated with three or more of the following billing functions:
   i. creating billing accounts;
   ii. deleting billing accounts;
   iii. creating records of billing events in a billing account;
   iv. setting the status of a billing account;
   v. obtaining the status of a billing account; and
   vi. obtaining an invoice for a billing account.

9. The computer-readable medium as claimed in claim 6, wherein said billing service is a rating service, and the web service interface defined for said rating service comprises application programming interfaces associated with three or more of the following billing functions:
   i. registering billable services;
   ii. obtaining a billing rate package for a billable service;
   iii. subscribing a billable service for a billing account;
   iv. unsubscribing a billable service for a billing account;
   v. obtaining subscribed billable service instances for a billing account; and
   vi. processing billing events.

10. The computer-readable medium as claimed in claim 6, wherein said plurality of object classes define three or more of the following objects:
   i. billing accounts;
   ii. billing events;
   iii. billing rate packages;
   iv. billable services;
   v. billing subscriptions; and
   vi. billable service instances.

11. A web service interface, which is implemented within software stored on a tangible computer readable medium, for a billing service for providing a plurality of billing functions to computing applications residing on one or more computing devices in a distributed network, and wherein:
   a) said web service interface is adapted for coupling to a billing engine;
   b) said billing engine resides on a computing device in said distributed network and is adapted to perform said plurality of billing functions;
   c) said web service interface comprises a plurality of application programming interfaces;
   d) each of said application programming interfaces is associated with associated with one of said billing functions; and
   e) each of said application programming interfaces being implemented such that the billing function associated therewith is performed after a web service invocation that commands performance of said billing function is received by said web service interface; wherein said web service interface is used to provide said billing service as a web service that is configured to be invoked by said computing applications in said distributed network.

12. The web service interface as claimed in claim 11, wherein said web service interface is extendable to provide said computing application with billing functions other than said plurality of billing functions, and said billing engine is adapted to perform said billing functions, wherein the Web service is a self-contained component that encapsulates functionality, which is made available to other computing applications over a network by web service invocation using a Simple Object Access Protocol (SOAP).

13. The web service interface as claimed in claim 11, wherein said billing service is a billing account service, and wherein the web service interface defined for said billing account service comprises application programming interfaces associated with the following billing functions:
   i. creating billing accounts;
   ii. deleting billing accounts;
   iii. creating records of billing events in a billing account;
   iv. setting the status of a billing account;
   v. obtaining the status of a billing account; and
   vi. obtaining an invoice for a billing account.

14. The web service interface as claimed in claim 11, wherein said billing service is a rating service, and wherein the web service interface defined for said rating service comprises application programming interfaces associated with the following billing functions:
   i. registering billable services;
   ii. obtaining a billing rate package for a billable service;
   iii. subscribing a billable service for a billing account;
   iv. unsubscribing a billable service for a billing account;
   v. obtaining subscribed billable service instances for a billing account; and
   vi. processing billing events.

15. The web service interface as claimed in claim 11, wherein data is communicated to said billing engine through at least one implemented application programming interface of said web service interface in at least three objects selected from the following group:
   i. billing account object;
   ii. billing event object;
   iii. billing rate package object;
   iv. billable service object;
   v. billing subscription object; and
   vi. billing service instance object.

16. A method for providing a billing service comprising: receiving a plurality of Web service invocations for a Web service interface, wherein each Web service invocation commands performance of a billing function, said billing function being performed by a billing engine hosted on a billing system, wherein the Web service interface is directly coupled to the billing engine, wherein said Web service invocation is digitally conveyed from a computing application executing on a computing device over a distributed network to the billing system, wherein said computing application provides at least one commercial service made available by a commercial service provider for a usage charge;
   executing the billing function of the billing engine responsive to receiving each Web service invocation, wherein executing of the billing functions for different ones of the Web service invocations comprise actions causing the billing engine to:

create a billing account for a user of the commercial service;

delete a billing account for a user of the commercial service;

create a record of a billing event in a billing account corresponding to a user of the commercial service;

obtain the status of a billing account corresponding to a user of the commercial service; and obtain an invoice for a billing account corresponding to a user of the commercial service wherein the Web service is a self-contained component that encapsulates functionality, which is made available to other computing applications over a network by web service invocation using a Simple Object Access Protocol (SOAP).

17. The software system as claimed in claim 1, wherein the Web service interface is directly coupled to the billing engine.

18. The computer-readable medium as claimed in claim 6, wherein the Web service interface is directly coupled to the billing engine.

19. The web service interface as claimed in claim 11, wherein the Web service interface is directly coupled to the billing engine.

* * * * *